(12) United States Patent
Fell et al.

(10) Patent No.: US 8,019,694 B2
(45) Date of Patent: Sep. 13, 2011

(54) SYSTEM AND METHOD FOR ESTIMATING FORWARD RETAIL COMMODITY PRICE WITHIN A GEOGRAPHIC BOUNDARY

(75) Inventors: Robert M. Fell, Summerland, CA (US); Scott Painter, Bel Air, CA (US); Michael R. Bonsignore, Seattle, WA (US); Brian P. Reed, Southlake, TX (US); Gary A. Magnuson, Corpus Christi, TX (US); Thomas D. Gros, Houston, TX (US)

(73) Assignee: Pricelock, Inc., Irving, TX (US)

( * ) Notice: Subject to any disclaimer, the term of this patent is extended or adjusted under 35 U.S.C. 154(b) by 727 days.

(21) Appl. No.: 12/030,086

(22) Filed: Feb. 12, 2008

(65) Prior Publication Data

US 2008/0313013 A1   Dec. 18, 2008

Related U.S. Application Data

(60) Provisional application No. 60/900,931, filed on Feb. 12, 2007, provisional application No. 60/900,930, filed on Feb. 12, 2007, provisional application No. 60/966,566, filed on Aug. 29, 2007.

(51) Int. Cl.
   *G06F 17/00* (2006.01)
(52) U.S. Cl. ........................................ 705/400
(58) Field of Classification Search .................. 705/400
   See application file for complete search history.

(56) References Cited

U.S. PATENT DOCUMENTS

| | | | |
|---|---|---|---|
| 3,691,527 A | 9/1972 | Yamamoto | |
| 3,852,576 A | 12/1974 | Rudd | |
| 4,723,212 A | 2/1988 | Mindrum et al. | |
| 4,821,186 A | 4/1989 | Munakata et al. | |
| 4,825,045 A | 4/1989 | Humble | |
| 4,910,672 A | 3/1990 | Off et al. | |
| 5,056,019 A | 10/1991 | Schultz et al. | |
| 5,173,851 A | 12/1992 | Off et al. | |

(Continued)

FOREIGN PATENT DOCUMENTS

AU    2006100751 A4    12/2006

(Continued)

OTHER PUBLICATIONS

Liu, Lon-Mu, "Dynamic Relationship Analysis of US Gasoline and Crude Oil Prices," Journal of Forecasting, Sep. 1991, p. 521-547.*

(Continued)

*Primary Examiner* — Nathan Erb
(74) *Attorney, Agent, or Firm* — Sprinkle IP Law Group

(57) ABSTRACT

Embodiments disclosed herein provide a new way to generate estimated forward retail prices for a retail commodity within a geographic boundary that represents a target market. Using estimates for local retail prices, combined with knowledge of current and historical wholesale prices, embodiments disclosed herein enable the creation of a forward estimate of retail prices on fuels for a specific location, time period, and fuel grade. In some embodiment, the process of creating a forward estimate of retail prices on fuels comprises performing a predictive modeling utilizing wholesale gasoline prices, rack markup, retail markup, and taxes on a location, time period, and fuel grade basis. In some cases, the estimated forward retail prices thus generated can be used in a pricing model for price protection services for that retail commodity in that target market.

20 Claims, 7 Drawing Sheets

U.S. PATENT DOCUMENTS

| | | | |
|---|---|---|---|
| 5,200,889 | A | 4/1993 | Mori |
| 5,202,826 | A | 4/1993 | McCarthy |
| 5,481,094 | A | 1/1996 | Suda |
| 5,521,364 | A | 5/1996 | Kimura et al. |
| 5,612,868 | A | 3/1997 | Off et al. |
| 5,710,887 | A | 1/1998 | Chelliah et al. |
| 5,806,045 | A | 9/1998 | Biorge et al. |
| 5,822,735 | A | 10/1998 | De Lapa et al. |
| 5,862,222 | A | 1/1999 | Gunnarsson |
| 5,873,069 | A | 2/1999 | Reuhl et al. |
| 5,890,137 | A | 3/1999 | Koreeda |
| 6,078,900 | A | 6/2000 | Ettl et al. |
| 6,098,879 | A | 8/2000 | Terranova |
| 6,112,981 | A | 9/2000 | McCall |
| 6,116,505 | A | 9/2000 | Withrow |
| 6,145,741 | A | 11/2000 | Wisdom et al. |
| 6,151,565 | A | 11/2000 | Lobley et al. |
| 6,152,591 | A | 11/2000 | McCall et al. |
| 6,157,871 | A | 12/2000 | Terranova |
| 6,193,155 | B1 | 2/2001 | Walker et al. |
| 6,249,772 | B1 | 6/2001 | Walker et al. |
| 6,298,329 | B1 | 10/2001 | Walker et al. |
| 6,321,984 | B1 | 11/2001 | McCall et al. |
| 6,332,128 | B1 | 12/2001 | Nicholson |
| 6,422,464 | B1 | 7/2002 | Terranova |
| 6,526,277 | B1 | 2/2003 | Zicker et al. |
| 6,594,644 | B1 | 7/2003 | Van Dusen |
| 6,601,033 | B1 | 7/2003 | Sowinski |
| 6,611,811 | B1 | 8/2003 | Deaton |
| 6,637,648 | B1 | 10/2003 | Gilgen et al. |
| 6,732,081 | B2 | 5/2004 | Nicholson |
| 6,741,968 | B2 | 5/2004 | Jacoves et al. |
| 6,741,969 | B1 | 5/2004 | Chen et al. |
| 6,754,636 | B1 | 6/2004 | Walker |
| 6,778,967 | B1 | 8/2004 | Nicholson |
| 6,862,580 | B1 | 3/2005 | Ford |
| 6,862,612 | B1 | 3/2005 | Horn |
| 6,885,996 | B2 | 4/2005 | Nicholson |
| 6,965,872 | B1 | 11/2005 | Grdina |
| 6,980,960 | B2 | 12/2005 | Hajdukiewicz et al. |
| 7,054,837 | B2 | 5/2006 | Hoffman et al. |
| 7,080,026 | B2 | 7/2006 | Singh et al. |
| 7,080,034 | B1 | 7/2006 | Reams |
| 7,092,929 | B1 | 8/2006 | Dvorak et al. |
| 7,162,444 | B1 | 1/2007 | Machado, Jr. et al. |
| 7,188,076 | B2 | 3/2007 | Bensemana |
| 7,343,341 | B2 | 3/2008 | Sandor et al. |
| 7,346,520 | B2 | 3/2008 | Etzioni et al. |
| 7,373,320 | B1 | 5/2008 | McDonough |
| 7,376,580 | B1 | 5/2008 | Walker et al. |
| 7,376,603 | B1 * | 5/2008 | Mayr et al. ..................... 705/35 |
| 7,379,890 | B2 | 5/2008 | Myr et al. |
| 7,383,204 | B2 | 6/2008 | McCall et al. |
| 7,437,323 | B1 * | 10/2008 | Valkov et al. ................ 705/36 R |
| 7,617,111 | B1 * | 11/2009 | Sheppard et al. ............. 705/1.1 |
| 7,650,109 | B2 | 1/2010 | Shimakawa et al. |
| 7,747,500 | B2 | 6/2010 | Hwang et al. |
| 7,945,500 | B2 | 5/2011 | Fell et al. |
| 7,945,501 | B2 | 5/2011 | Fell et al. |
| 2001/0039512 | A1 | 11/2001 | Nicholson |
| 2001/0042036 | A1 | 11/2001 | Sanders |
| 2001/0049626 | A1 | 12/2001 | Nicholson |
| 2001/0049651 | A1 | 12/2001 | Selleck |
| 2001/0049668 | A1 | 12/2001 | Wright |
| 2002/0013758 | A1 | 1/2002 | Khaitan |
| 2002/0026403 | A1 | 2/2002 | Tambay et al. |
| 2002/0029171 | A1 | 3/2002 | Senior |
| 2002/0035549 | A1 | 3/2002 | Hagio et al. |
| 2002/0038279 | A1 | 3/2002 | Samuelson et al. |
| 2002/0040321 | A1 | 4/2002 | Nicholson |
| 2002/0052793 | A1 | 5/2002 | Dines et al. |
| 2002/0069155 | A1 | 6/2002 | Nafeh et al. |
| 2002/0073007 | A1 | 6/2002 | Ayache |
| 2002/0107642 | A1 | 8/2002 | Nishida et al. |
| 2002/0120555 | A1 | 8/2002 | Lerner |
| 2002/0138392 | A1 | 9/2002 | LeBlanc |
| 2002/0143616 | A1 | 10/2002 | Hajdukiewicz |
| 2002/0143693 | A1 | 10/2002 | Soestbergen et al. |
| 2002/0161645 | A1 | 10/2002 | Walker et al. |
| 2002/0165809 | A1 | 11/2002 | Gendelman |
| 2002/0194094 | A1 | 12/2002 | Lancaster et al. |
| 2003/0014287 | A1 | 1/2003 | Williams et al. |
| 2003/0018573 | A1 | 1/2003 | Comas et al. |
| 2003/0033154 | A1 | 2/2003 | Hajdukiewicz |
| 2003/0050807 | A1 | 3/2003 | Hoffman et al. |
| 2003/0074267 | A1 | 4/2003 | Acharya et al. |
| 2003/0078787 | A1 | 4/2003 | Hoffman et al. |
| 2003/0088435 | A1 | 5/2003 | King |
| 2003/0088466 | A1 | 5/2003 | Fitzpatrick |
| 2003/0101123 | A1 | 5/2003 | Alvarado et al. |
| 2003/0101125 | A1 | 5/2003 | McGill et al. |
| 2003/0158773 | A1 | 8/2003 | Brunner |
| 2003/0195822 | A1 | 10/2003 | Tatge et al. |
| 2003/0197060 | A1 | 10/2003 | Coyner |
| 2003/0208430 | A1 | 11/2003 | Gershon |
| 2003/0208437 | A1 | 11/2003 | Samuelson |
| 2003/0229571 | A1 | 12/2003 | May |
| 2003/0236738 | A1 | 12/2003 | Lange et al. |
| 2004/0015454 | A1 | 1/2004 | Raines et al. |
| 2004/0024692 | A1 | 2/2004 | Turbeville et al. |
| 2004/0034584 | A1 | 2/2004 | Cory, Sr. et al. |
| 2004/0039684 | A1 | 2/2004 | Sandor |
| 2004/0088179 | A1 | 5/2004 | Cogen et al. |
| 2004/0093298 | A1 | 5/2004 | McClure, III et al. |
| 2004/0103003 | A1 | 5/2004 | Mayers et al. |
| 2004/0111358 | A1 | 6/2004 | Lange et al. |
| 2004/0117291 | A1 | 6/2004 | O'Callahan |
| 2004/0122732 | A1 | 6/2004 | Comer |
| 2004/0122764 | A1 | 6/2004 | Bilski et al. |
| 2004/0128263 | A1 | 7/2004 | Dosanjh |
| 2004/0138927 | A1 | 7/2004 | Eydeland et al. |
| 2004/0148236 | A1 | 7/2004 | Steidlmayer |
| 2004/0148249 | A1 | 7/2004 | Kinnear |
| 2004/0158493 | A1 | 8/2004 | Nicholson |
| 2004/0177019 | A1 | 9/2004 | Slavov et al. |
| 2004/0210478 | A1 | 10/2004 | Pettigrew et al. |
| 2004/0215529 | A1 * | 10/2004 | Foster et al. ..................... 705/26 |
| 2004/0230493 | A1 | 11/2004 | Tatge et al. |
| 2004/0230520 | A1 | 11/2004 | Reding et al. |
| 2004/0260613 | A1 | 12/2004 | Mills |
| 2004/0260632 | A1 | 12/2004 | Wanasek |
| 2005/0027650 | A1 | 2/2005 | Walker et al. |
| 2005/0044001 | A1 | 2/2005 | Narayanaswami |
| 2005/0091139 | A1 | 4/2005 | Kumar et al. |
| 2005/0097025 | A1 | 5/2005 | Horton et al. |
| 2005/0114252 | A1 | 5/2005 | Beurskens |
| 2005/0144100 | A1 | 6/2005 | Shapiro et al. |
| 2005/0149402 | A1 | 7/2005 | Nicholson |
| 2005/0154669 | A1 | 7/2005 | Streetman |
| 2005/0159974 | A1 | 7/2005 | Moss et al. |
| 2005/0160006 | A1 | 7/2005 | Pate |
| 2005/0160014 | A1 | 7/2005 | Moss et al. |
| 2005/0182660 | A1 | 8/2005 | Henley |
| 2005/0192711 | A1 | 9/2005 | Raines et al. |
| 2005/0209917 | A1 | 9/2005 | Anderson et al. |
| 2005/0209921 | A1 | 9/2005 | Roberts et al. |
| 2005/0216384 | A1 | 9/2005 | Partlow et al. |
| 2005/0228747 | A1 | 10/2005 | Gumport |
| 2005/0240492 | A1 | 10/2005 | Grdina |
| 2005/0261916 | A1 | 11/2005 | McCall |
| 2005/0289021 | A1 | 12/2005 | Lagergren |
| 2006/0015424 | A1 | 1/2006 | Esposito et al. |
| 2006/0026095 | A1 | 2/2006 | Alvarado et al. |
| 2006/0031123 | A1 | 2/2006 | Leggett et al. |
| 2006/0036530 | A1 | 2/2006 | Shkedy |
| 2006/0080196 | A1 | 4/2006 | Griffin et al. |
| 2006/0080265 | A1 | 4/2006 | Hinds et al. |
| 2006/0085252 | A1 | 4/2006 | Kersenbrock |
| 2006/0095362 | A1 | 5/2006 | Hwang et al. |
| 2006/0155423 | A1 | 7/2006 | Budike |
| 2006/0184445 | A1 | 8/2006 | Sandor et al. |
| 2006/0190383 | A1 | 8/2006 | May |
| 2006/0190386 | A1 | 8/2006 | Levy |
| 2006/0212384 | A1 | 9/2006 | Spurgin et al. |
| 2006/0218056 | A1 | 9/2006 | Dickman |
| 2006/0241951 | A1 | 10/2006 | Cynamom et al. |
| 2006/0293947 | A1 | 12/2006 | Nicholson |

| Pub. No. | Date | Name |
|---|---|---|
| 2006/0293952 A1 | 12/2006 | Nicholson |
| 2006/0293953 A1 | 12/2006 | Nicholson |
| 2006/0293980 A1 | 12/2006 | Corby et al. |
| 2007/0016502 A1 | 1/2007 | Williamson et al. |
| 2007/0032941 A1 | 2/2007 | Allen |
| 2007/0038553 A1 | 2/2007 | Miller et al. |
| 2007/0061174 A1 | 3/2007 | Phillips |
| 2007/0061220 A1 | 3/2007 | Vaid |
| 2007/0095890 A1 | 5/2007 | Elefant |
| 2007/0106559 A1 | 5/2007 | Harrell |
| 2007/0195486 A1 | 8/2007 | Paul et al. |
| 2007/0198385 A1 | 8/2007 | McGill et al. |
| 2007/0203793 A1 | 8/2007 | Hajdukiewicz et al. |
| 2007/0203794 A1 | 8/2007 | Hajdukiewicz et al. |
| 2007/0233616 A1 | 10/2007 | Richards et al. |
| 2007/0255457 A1 | 11/2007 | Whitcomb et al. |
| 2007/0267479 A1 | 11/2007 | Nix et al. |
| 2007/0267482 A1 | 11/2007 | Ruckart et al. |
| 2007/0276738 A1 | 11/2007 | Rajunas, III |
| 2007/0288312 A1 | 12/2007 | Wang |
| 2007/0294159 A1 | 12/2007 | Cottleq |
| 2008/0005008 A1 | 1/2008 | Alvarado et al. |
| 2008/0015964 A1 | 1/2008 | Shuster |
| 2008/0015976 A1 | 1/2008 | Sandor et al. |
| 2008/0015981 A1 | 1/2008 | Danesh |
| 2008/0027737 A1 | 1/2008 | Watkins |
| 2008/0033833 A1 | 2/2008 | Senior |
| 2008/0080682 A1 | 4/2008 | Ogunwale et al. |
| 2008/0097877 A1 | 4/2008 | Rahal |
| 2008/0097888 A1 | 4/2008 | Sugihara |
| 2008/0114622 A1 | 5/2008 | Crean et al. |
| 2008/0126208 A1 | 5/2008 | Nicholson et al. |
| 2008/0133430 A1 | 6/2008 | Horowitz |
| 2008/0243663 A1* | 10/2008 | Eveland .......... 705/35 |
| 2009/0198621 A1 | 8/2009 | Schneier et al. |
| 2010/0042488 A1 | 2/2010 | McClung, III |

FOREIGN PATENT DOCUMENTS

| | | |
|---|---|---|
| AU | 2007100932 A4 | 10/2007 |
| CA | 2070736 | 12/1992 |
| CA | 2217739 A1 | 4/1996 |
| CA | 2340966 A1 | 9/2001 |
| JP | 2217998 A | 8/1990 |
| JP | 04373069 A | 12/1992 |
| JP | 10111985 A | 4/1998 |
| JP | 2002063347 A | 2/2002 |
| JP | 2002215640 A | 8/2002 |
| JP | 2003108850 A | 4/2003 |
| JP | 2003128198 A | 5/2003 |
| JP | 2003233743 A | 8/2003 |
| JP | 2004145534 A1 | 5/2004 |
| JP | 200425269 A | 9/2004 |
| JP | 2004318422 A | 11/2004 |
| JP | 2005122766 A | 5/2005 |
| JP | 2005135347 A | 5/2005 |
| JP | 2006335438 A | 12/2006 |
| JP | 2007122592 A | 5/2007 |
| JP | 2007249410 A | 9/2007 |
| WO | WO 9118373 A1 | 11/1991 |
| WO | WO 9214213 | 8/1992 |
| WO | WO 9301466 A1 | 1/1993 |
| WO | WO 9309398 A1 | 5/1993 |
| WO | WO 9606415 | 2/1996 |
| WO | WO 9706250 | 2/1997 |
| WO | WO 9818053 A1 | 4/1998 |
| WO | WO 9835490 A1 | 8/1998 |
| WO | WO 0003022 A2 | 1/2000 |
| WO | WO 0104327 | 1/2001 |
| WO | WO 0125875 A2 | 4/2001 |
| WO | WO 0125989 A1 | 4/2001 |
| WO | WO 0126000 A1 | 4/2001 |
| WO | WO 0126003 A1 | 4/2001 |
| WO | WO 0155885 A2 | 8/2001 |
| WO | WO0161671 A | 8/2001 |
| WO | WO 0177961 A1 | 10/2001 |
| WO | WO 0188743 A2 | 11/2001 |
| WO | WO 0195225 A1 | 12/2001 |
| WO | WO 0211018 A1 | 2/2002 |
| WO | WO0212113 A1 | 2/2002 |
| WO | WO 0213091 A1 | 2/2002 |
| WO | WO 0217193 A1 | 2/2002 |
| WO | WO 0233621 A1 | 4/2002 |
| WO | WO 0233635 A1 | 4/2002 |
| WO | WO 0233636 A1 | 4/2002 |
| WO | WO 0233637 A1 | 4/2002 |
| WO | WO 0241120 A2 | 5/2002 |
| WO | WO 0244847 A2 | 6/2002 |
| WO | WO 02061663 A2 | 8/2002 |
| WO | WO 02069109 A2 | 9/2002 |
| WO | WO 02069110 A2 | 9/2002 |
| WO | WO 02075485 A2 | 9/2002 |
| WO | WO 02075488 A2 | 9/2002 |
| WO | WO 02079923 A2 | 10/2002 |
| WO | WO 02079940 A2 | 10/2002 |
| WO | WO 02080041 A1 | 10/2002 |
| WO | WO 02088888 A2 | 11/2002 |
| WO | WO 02088906 A2 | 11/2002 |
| WO | WO 02093302 A2 | 11/2002 |
| WO | WO 02093328 A2 | 11/2002 |
| WO | WO 02098045 A2 | 12/2002 |
| WO | WO 02099589 A2 | 12/2002 |
| WO | WO 02099601 A2 | 12/2002 |
| WO | WO 02103487 A2 | 12/2002 |
| WO | WO 02103489 A2 | 12/2002 |
| WO | WO 03003150 A2 | 1/2003 |
| WO | WO 03012584 A2 | 2/2003 |
| WO | WO 03012585 A2 | 2/2003 |
| WO | WO 03012586 A2 | 2/2003 |
| WO | WO 03012589 A2 | 2/2003 |
| WO | WO 03032112 A2 | 4/2003 |
| WO | WO 03036432 A2 | 5/2003 |
| WO | WO 03036466 A1 | 5/2003 |
| WO | WO 03038375 A1 | 5/2003 |
| WO | WO 03038547 A1 | 5/2003 |
| WO | WO 03038651 A1 | 5/2003 |
| WO | WO 03038675 A1 | 5/2003 |
| WO | WO 03038676 A1 | 5/2003 |
| WO | WO 03053124 A2 | 7/2003 |
| WO | WO 03062738 A2 | 7/2003 |
| WO | WO 03065278 A1 | 8/2003 |
| WO | WO 03069433 A2 | 8/2003 |
| WO | WO 03069840 A1 | 8/2003 |
| WO | WO 03077054 A2 | 9/2003 |
| WO | WO 03079214 A1 | 9/2003 |
| WO | WO 03087708 A1 | 10/2003 |
| WO | WO 03098516 A1 | 11/2003 |
| WO | WO 03104938 A2 | 12/2003 |
| WO | WO 03104944 A2 | 12/2003 |
| WO | WO 03105054 A1 | 12/2003 |
| WO | WO 2004001537 A2 | 12/2003 |
| WO | WO 2004001538 A2 | 12/2003 |
| WO | WO 2004001544 A2 | 12/2003 |
| WO | WO 2004003699 A2 | 1/2004 |
| WO | WO 2004003811 A1 | 1/2004 |
| WO | WO 2004010262 A2 | 1/2004 |
| WO | WO 2004021102 A2 | 3/2004 |
| WO | WO 2004029781 A2 | 4/2004 |
| WO | WO 2004046989 A1 | 6/2004 |
| WO | WO 2004047082 A2 | 6/2004 |
| WO | WO2004059547 A1 | 7/2004 |
| WO | WO 2004061596 A2 | 7/2004 |
| WO | WO 2004061785 A2 | 7/2004 |
| WO | WO 2004072778 A2 | 8/2004 |
| WO | WO 2004072803 A2 | 8/2004 |
| WO | WO 2004077256 A2 | 9/2004 |
| WO | WO 2004084028 A2 | 9/2004 |
| WO | WO 2004084046 A2 | 9/2004 |
| WO | WO 2005057458 A1 | 6/2005 |
| WO | WO 2005065131 A2 | 7/2005 |
| WO | WO2005069871 A2 | 8/2005 |
| WO | WO 2005101996 A2 | 11/2005 |
| WO | WO 2006049779 A1 | 5/2006 |
| WO | WO2006055117 A2 | 5/2006 |
| WO | WO 2006083709 A2 | 8/2006 |
| WO | WO 2006110121 A1 | 10/2006 |
| WO | WO 2007002065 A2 | 1/2007 |

| | | | |
|---|---|---|---|
| WO | WO2007004443 A2 | 4/2007 | |
| WO | WO2007059165 A1 | 5/2007 | |
| WO | WO2007079228 A2 | 7/2007 | |

OTHER PUBLICATIONS

Barron, John, M., Taylor, Beck A., and Umbeck, John R., "Will Open Supply Lower Retail Gasoline Prices?" Contemporary Economic Policy, Jan. 2004, pp. 63-77.*
Edwards, Franklin R., and Canter, Michael S., "The Collapse of Metallgesellschaft: Unhedgeable Risks, Poor Hedging Strategy, or Just Bad Luck?" The Journal of Futures Markets, May 1995, p. 211.*
Office Action issued for U.S. Appl. No. 12/030,073, mailed on May 1, 2009, 11 pgs.
Office Action issued for U.S. Appl. No. 11/705,571, mailed on Aug. 14, 2009, 13 pgs.
International Preliminary Report on Patentability for PCT Application No. PCT/US2008/053669, mailed Aug. 27, 2009, issued Aug. 19, 2009, 9 pgs.
International Preliminary Report on Patentability for PCT Application No. PCT/US2008/053676, mailed Aug. 27, 2009, issued Aug. 19, 2009, 6 pgs.
International Preliminary Report on Patentability for PCT Application No. PCT/US2008/053674, mailed Aug. 27, 2009, issued Aug. 19, 2009, 7 pgs.
International Preliminary Report on Patentability for PCT Application No. PCT/US2008/053686, mailed Aug. 27, 2009, issued Aug. 19, 2009, 6 pgs.
International Preliminary Report on Patentability for PCT Application No. CT/US2008/053687, mailed Aug. 27, 2009, issued Aug. 19, 2009, 6 pgs.
International Preliminary Report on Patentability for PCT Application No. PCT/US2008/053695, mailed Aug. 27, 2009, issued Aug. 19, 2009, 5 pgs.
International Preliminary Report on Patentability for PCT Application No. PCT/US2008/053699, mailed Aug. 27, 2009, issued Aug. 19, 2009, 5 pgs.
International Preliminary Report on Patentability for PCT Application No. PCT/US2008/053724, mailed Aug. 27, 2009, issued Aug. 19, 2009, 6 pgs.
Office Action issued for U.S. Appl. No. 12/370,430 mailed on Jan. 20, 2010, 14 pgs.
Office Action issued for U.S. Appl. No. 11/705,571 mailed on Apr. 23, 2010, 16 pgs.
Office Action issued for U.S. Appl. No. 12/099,237 mailed May 21, 2010, 8 pgs.
Office Action issued for U.S. Appl. No. 12/099,253 mailed May 25, 2010, 9 pgs.
Office Action issued for U.S. Appl. No. 12/099,224 mailed May 26, 2010, 7 pgs.
Office Action issued for U.S. Appl. No. 12/029,961 mailed Jun. 23, 2010, 13 pgs.
Office Action issued for U.S. Appl. No. 12/370,430 mailed Jul. 7, 2010, 13 pgs.
GasLimit "Frequently Asked Questions", 2 pages, obtained from http://www.gaslimit.com/faq on Jan. 2, 2008.
GasLimit "Current Gas Prices", 2 pages, obtained from http://www.gaslimit.com/current-gas-prices.php on Jan. 2, 2008.
GasLimit "Terms and Conditions", 4 pages, obtained from http://www.gaslimit.com/terms_and_condition on Jan. 2, 2008.
GasLimit "Quote Steps 1-5", 5 pages, obtained from http://www.gaslimit.com/legacy on Jan. 2, 2008.
GasLimit "Gas Cap Cancellation Information", 1 page, obtained from http://www.gaslimit.com/cancel_info on Jan. 2, 2008.
"Price Changes in the Gasoline Market: Are Midwestern Gasoline Prices Downward Sticky?", Energy Information Administration, Wash., DC; DOE/EIA-0626, pp. i-55, Feb. 1999.
Jacobson, S. "Recognizing Embedded Risks in Energy", 4 pages, downloaded from http://www.derivativesstrategy.com/magazine/archive/1999/1299col4.asp on Jan. 11, 2008.
Gordon, et al. Modelling Farm-Retail Price Linkage for Eight Agricultural Commodities (Technical Report #1/96), 65 pgs, Dept. of Econ, Univ. of Canada & Auckland, Nov. 1996.

Ervin, S., "Commodity Futures Modernization Act of 2000: A Practical Look at the Law that Revolutionized Derivatives Law and Regulation," 6 pages, Copyright 2001 Dechert.
Commodity Futures Trading Commission, Order, DOCID: fr21mr03-45; Federal Register, Notices, vol. 68, No. 55, pp. 1-6, Mar. 21, 2003, obtained from <<wais.access.gpo.gov>>.
"Congress Makes Changes to the Regulation of Futures and Derivatives Transactions", Publications/McDermott Newsletters, McDermott Will and Emery, 10 pages, Jan. 2001.
Marsh, J., 'Regulation of "Specialist Commodity Dealers" in the United States, Hunton & Williams, London, England, 10 pages, Oct. 19, 2005, obtained from <<www.hunton.com>>.
Request for Continued Examination, Extension of Time and Amendment as filed with U.S. Patent Office on Oct. 6, 2006 in U.S. Apppl. No. 09/853,196; 17 pages.
Office Action mailed from U.S. Patent Office on Dec. 13, 2006 in U.S. Appl. No. 09/805,950; 11 pages.
Office Action mailed from U.S. Patent Office on Dec. 15, 2006 in U.S. Appl. No. 09/853,196; 11 pages.
Asplund, M., et al. "Price Adjustments by a Gasoline Retail Chain", Scand. J. of Economics 102(1), 101-121, 2000.
Fischer, A., "Weather futures 'bet' will give Tucson firms a hedge against losses," Arizona Daily Star, Tucson, Arizona, Feb. 5, 1999, 3 pages.
Fuel Bank: lock in your price for gasoline, obtained from http://www.fuelbank.com on May 19, 2008, 1 page.
Tommelleo, D., "PRICELINE.COM plans to let Customers set Prices for Gasoline", The Augusta Chronicle, Augusta, Georgia, Feb. 26, 2000, 2 pages.
Skyline Products: Central Control Fuel Pricing Software, obtained from http://skylineproducts.com on Feb. 10, 2007, 3 pages.
Skyline Products Inc. Press Release: Skyline Products Partners with Excentus to Offer a Certified Fuel Pricing Integration for High-Volume Retailers, 1 page.
PCT/US2008/053686, International Search Report and Written Opinion mailed Jun. 5, 2008.
PCT/US2008/053669, International Search Report and Written Opinion mailed Jun. 5, 2008.
PCT/US2008/053676, International Search Report and Written Opinion mailed Jun. 5, 2008.
PCT/US2008/053674, International Search Report and Written Opinion mailed Jun. 5, 2008.
PCT/US2008/053687, International Search Report and Written Opinion mailed Jun. 5, 2008.
Chao, et al. "Restructured Electricity Markets: A Risk Management Approach", [Retrieved online from URL:http://www.ieor.berkeley.edu], presented Jul. 1, 2005, 36 pages.
PCT/US2008/053724, International Search Report and Written Opinion mailed Jun. 5, 2008.
PCT/US2008/053695, International Search Report and Written Opinion mailed Jun. 5, 2008.
PCT/US2008/59633, International Search Report and Written Opinion mailed Jul. 8, 2008.
PCT/US2008/059609, International Search Report and Written Opinion mailed Jul. 1, 2008.
PCT/US2008/053699, International Search Report and Written Opinion mailed Jun. 27, 2008.
PCT/US2008/059619, International Search Report and Written Opinion mailed Aug. 15, 2008.
PCT/US2008/059614, International Search Report and Written Opinion mailed Aug. 25, 2008.
International Preliminary Report on Patentability for PCT Application No. PCT/US2008/059633, issued Oct. 13, 2009, mailed Oct. 22, 2009, 6 pgs.
International Preliminary Report on Patentability for PCT Application No. PCT/US2008/059619, issued Oct. 13, 2009, mailed Oct. 22, 2009, 6 pgs.
International Preliminary Report on Patentability for PCT Application No. PCT/US2008/059609, issued Oct. 13, 2009, mailed Oct. 22, 2009, 6 pgs.
International Preliminary Report on Patentability for PCT Application No. PCT/US2008/059614, issued Oct. 13, 2009, mailed Oct. 22, 2009, 4 pgs.

Final Office Action issued for U.S. Appl. No. 12/030,073 mailed on Nov. 24, 2009, 12 pgs.

Office Action issued for U.S. Appl. No. 12/030,012, mailed on Jul. 22, 2010, 12 pgs.

Office Action issued for U.S. Appl. No. 12/099,209, mailed on Aug. 3, 2010, 17 pgs.

Office Action issued for U.S. Appl. No. 12/030,032, mailed on Sep. 28, 2010, 9 pgs.

Office Action issued for U.S. Appl. No. 12/370,395, mailed on Oct. 7, 2010, 11 pgs.

Office Action issued for U.S. Appl. No. 12/099,253, mailed on Oct. 26, 2010, 10 pgs.

Office Action issued for U.S. Appl. No. 12/030,119, mailed on Oct. 27, 2010, 16 pgs.

TechWeb, "Bargain Hunters Topple AAA Gas-Price Finder," Manhasset, May 27, 2005, (1 pg.).

Shanley, Will, "Drivers can Use the Internet to Find Cheap Gasoline," Knight Ridder Tribune Business News, Washington, May 26, 2005, (1 pg.).

Day to Day, "Using the Internet to Search for Cheap Gas," Los Angeles, Apr. 27, 2006, (1 pg.).

Maunsell, Nevill Boyd, "City View: Savers and Borrowers Hang on to Shares," Birmingham Post, Post Edition, Birmingham (UK), Nov. 30, 2000, (1 pg.).

Office Action issued for U.S. Appl. No. 12/099,237, mailed on Nov. 10, 2010, 7 pgs.

Office Action issued for U.S. Appl. No. 12/029,961, mailed on Nov. 17, 2010, 15 pgs.

Office Action issued for U.S. Appl. No. 12/030,041, mailed on Nov. 16, 2010, 14 pgs.

Office Action issued for U.S. Appl. No. 12/370,430, mailed on Jan. 13, 2011, 15 pgs.

Office Action issued for U.S. Appl. No. 12/099,209, mailed on Jan. 20, 2011, 19 pgs.

Office Action issued for U.S. Appl. No. 12/099,224, mailed on Nov. 12, 2010, 8 pgs.

Office Action issued for U.S. Appl. No. 11/705,571, mailed on Jan. 26, 2011, 20 pgs.

Roger G. Clarke, "Options and Futures: A Tutorial," The Research Foundation of the Institute of Chartered Financial Analysis, Dec. 1992/Rev. Aug. 1996, 46 pgs.

Phil Shook, "Futures Trading: The Fine Art of Managing Risk, or Shooting," NPN, National Petroleum News, Chicago: Feb. 1992, vol. 84, Issue 2, p. 37, 7 pgs.

Notice of Allowance issued for U.S. Appl. No. 12/099,224, mailed on Mar. 1, 2011, 5 pgs.

Notice of Allowance issued for U.S. Appl. No. 12/099,237, mailed on Mar. 3, 2011, 5 pgs.

"Locked-in rates for heating oil burn consumers," David Dishneau Associated Press, Journal—Gazette, Ft. Wayne, Ind. Oct. 11, 2006, 3 pgs.

"Fuel hardy as gas and oil prices rise, shoppers can place a premium on the pennies they save by using their heads at the pump," Kristen Andresen, Bangor Daily News, Bangor, ME, Oct. 1, 2005, 3 pgs.

Office Action for U.S. Appl. No. 12/030,041, mailed on Apr. 12, 2011, 19 pgs.

Office Action for U.S. Appl. No. 12/370,395, mailed on Apr. 13, 2011, 12 pgs.

Office Action issued for U.S. Appl. No. 12/029,961, mailed May 12, 2011, 14 pgs.

Office Action issued for U.S. Appl. No. 12/030,032, mailed May 23, 2011, 10 pgs.

Office Action issued for U.S. Appl. No. 13/076,567, mailed May 24, 2011, 6 pgs.

Office Action issued for U.S. Appl. No. 13/076,741, mailed May 24, 2011, 6 pgs.

Final Office Action issued for U.S. Appl. No. 12/370,430, mailed Jun. 1, 2011, 16 pgs.

Final Office Action issued for U.S. Appl. No. 12/030,119 mailed on Jul. 8, 2011, 5 pgs.

Final Office Action issued for U.S. Appl. No. 11/705,571 mailed on Jul. 13, 2011, 11 pgs.

* cited by examiner

SYSTEM AND METHOD FOR ESTIMATING FORWARD RETAIL COMMODITY PRICE WITHIN A GEOGRAPHIC BOUNDARY

CROSS-REFERENCE TO RELATED APPLICATIONS

This application claims priority from Provisional Patent Applications No. 60/900,931, filed Feb. 12, 2007, entitled "SYSTEM AND METHOD FOR ESTIMATING FORWARD RETAIL COMMODITY PRICE," No. 60/900,930, filed Feb. 12, 2007, entitled "SYSTEM AND METHOD OF DETERMINING A RETAIL COMMODITY PRICE WITHIN A GEOGRAPHIC BOUNDARY," and Provisional Patent Application No. 60/966,566, filed Aug. 29, 2007, entitled "SYSTEM AND METHOD OF DETERMINING A RETAIL COMMODITY PRICE WITHIN A GEOGRAPHIC BOUNDARY," the entire contents of which are hereby expressly incorporated by reference for all purposes.

FIELD OF THE INVENTION

The present invention relates generally to predictive modeling on retail commodity prices. More particularly, the present invention relates to a system and method for determining forward retail commodity prices with particular constraints including time and geographic boundaries.

BACKGROUND

There is a continuing interest in the relationship between the retail price and the wholesale price for commodities. The retail price of a commodity generally reflects the wholesale price plus the cost of marketing the commodity from the raw material level to the retail level. In the case of gasoline, the Energy Information Administration (EIA), the independent statistical and analytical agency within the Department of Energy (DOE), published a study entitled "Price Changes in the Gasoline Market," DOE/EIA-0626, February 1999. In this EIA report, the retail price of gasoline is divided into three main components: crude oil prices, manufacturing and marketing costs and profits, and taxes (see FIG. 1). Crude oil prices are considered to be the most important component of the retail price of gasoline. One reason is that, while manufacturing and marketing costs may change relatively slowly, crude oil prices can be extremely volatile, even on a daily basis. This volatility makes accurate prediction of the retail price of the gasoline very difficult. At the refinery level, the spot gasoline prices may move symmetrically in response to crude oil changes, which means that the volatility is also evident at the refinery level (see FIG. 2). The existence of a futures market for domestic crude oil permits the knowledge of actual prices to be disseminated very quickly. This allows gasoline prices further down the distribution chain such as rack prices to be closely correlated to spot prices (see FIG. 3).

However, at the retail level, previous studies on gasoline prices have found price asymmetry. Price asymmetry is the phenomenon where prices tend to move differently depending on their direction. In the case of gasoline, this means that retail prices for gasoline may rise faster than they fall. Moreover, although retail prices are not very closely correlated to rack prices (see FIG. 4), for the most part they move in response to changes in wholesale or raw material prices further upstream in the manufacturing-distribution chain. At the national level, lagged wholesale prices alone can thus be used to predict retail prices. FIG. 5 shows an example of a national average of actual and forecasted retail prices for gasoline on the national level where the forecasted retail prices are calculated using lagged wholesale prices on a week-by-week basis. Specifically, the next week's change in retail gasoline prices on the national level can be predicted from a symmetrical response model which consists of a moving average of prior wholesale gasoline prices. The closeness of the predicted estimates to the actual values shows that, on the national level, wholesale and retail gasoline prices are generally very closely linked. This closeness helps explain why it remains very difficult to predict price movement of gasoline, a type of commodity, below the national level and/or at a particular locale.

SUMMARY OF THE INVENTION

Within this disclosure, the term commodity refers to an article of commerce—an item that can be bought and sold freely on a market. It may be a product which trades on a commodity exchange or spot market and which may fall into one of several categories, including energy, food, grains, and metals. Currently, commodities that can be traded on a commodity exchange include, but are not limited to, crude oil, light crude oil, natural gasp heating oil, gasoline, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. For example, positions in the Goldman Sachs Commodity Index (GSCI) and the Reuters Jefferies Consumer Research Board Index (RJCRB Index) can be traded as a commodity. What matters is that something be exchanged for the thing. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded. In the case of crude oil, each of the hundreds of grades of fuel oil may be defined. For example, West Texas Intermediate (WTI), North Sea Brent Crude, etc. refer to grades of crude oil that meet selected standards such as sulfur content, specific gravity, etc., so that all parties involved in trading crude oil know the qualities of the crude oil being traded. Motor fuels such as gasoline represent examples of energy-related commodities that may meet standardized definitions. Thus, gasoline with an octane grade of 87 may be a commodity and gasoline with an octane grade of 93 may also be a commodity, and they may demand different prices because the two are not identical—even though they may be related. Those skilled in the art will appreciate that other commodities may have other ways to define a quality. Other energy-related commodities that may have a definable quality or that meet a standard include, but are not limited to, diesel fuel, heating oils, aviation fuel, and emission credits. Diesel fuels may generally be classified according to seven grades based in part on sulfur content, emission credits may be classified based on sulfur or carbon content, etc.

Historically, risk is the reason exchange trading of commodities began. For example, because a farmer does not know what the selling price will be for his crop, he risks the margin between the cost of producing the crop and the price he achieves in the market. In some cases, investors can buy or sell commodities in bulk through futures contracts. The price of a commodity is subject to supply and demand.

A commodity may refer to a retail commodity that can be purchased by a consuming public and not necessarily the wholesale market only. One skilled in the art will recognize that embodiments disclosed herein may provide means and mechanisms through which commodities that currently can only be traded on the wholesale level may be made available to retail level for retail consumption by the public. One way to achieve this is to bring technologies that were once the private reserves of the major trading houses and global energy firms down to the consumer level and provide tools that are applicable and useful to the retail consumer so they can mitigate and/or manage their measurable risks involved in buying/selling their commodities. One example of an energy related retail commodity is motor fuels, which may include various grades of gasoline. For example, motor fuels may include 87 octane grade gasoline, 93 octane grade gasoline, etc as well as various grades of diesel fuels. Other examples of an energy related retail commodity could be jet fuel, heating oils, electricity or emission credits such as carbon offsets. Other retail commodities are possible and/or anticipated.

While a retail commodity and a wholesale commodity may refer to the same underlying good, they are associated with risks that can be measured and handled differently. One reason is that, while wholesale commodities generally involve sales of large quantities, retail commodities may involve much smaller transaction volumes and relate much more closely to how and where a good is consumed. The risks associated with a retail commodity therefore may be affected by local supply and demand and perhaps different factors. Within the context of this disclosure, there is a definable relationship between a retail commodity and the exposure of risks to the consumer. This retail level of the exposure of risks may correlate to the size and the specificity of the transaction in which the retail commodity is traded. Other factors may include the granularity of the geographic market where the transaction takes place, and so on. For example, the demand for heating oil No. 2 in January may be significantly different in the Boston market than in the Miami market.

Pricing a retail commodity can be a very difficult process, particularly if that retail commodity tends to fluctuate in an unpredictable manner. Take gasoline as an example, as the price of oil continues to fluctuate globally and fluidly, fuel prices at the pump can change from location to location on a daily or even hourly basis.

In such a volatile market, it is extremely difficult to reliably predict retail fuel prices for a specific location, time period, and fuel grade/type.

Embodiments disclosed herein provide a new way to generate estimated forward retail gas prices within a geographic boundary based on a plurality of factors.

More specifically, some embodiments disclosed herein provide a system and method for determining an estimated forward retail price (EFRP) for gasoline based on location (L), time period (T), and fuel grade (G) within a geographic boundary that represents a target market.

Using estimates for local retail prices, combined with knowledge of current and historical wholesale prices, embodiments disclosed herein enable the creation of a forward estimate of retail prices on fuels for a specific location, time period, and fuel grade. Data generated in the process can be used as the primary input to an analytic process that supports a fuel purchase management and decision making tool, benefiting its variety of users. Examples of such users include, but not limited to, fleet managers, financial managers, consumers, investment bankers, and other financial analysts, etc. In some embodiment, the process of creating a forward estimate of retail prices on fuels comprises performing a predictive modeling utilizing wholesale gasoline prices, rack markup, retail markup, and taxes on a location, time period, and fuel grade basis. The predictive model disclosed herein can be augmented in various ways. As an example, one embodiment of the predictive model can be configured to take into consideration the effect of low-probability events on the future prices of gasoline. Examples of such events may include, but not limited to, natural or manmade events such as hurricanes, fire, war, etc.

These, and other, aspects will be better appreciated and understood when considered in conjunction with the following description and the accompanying drawings. The following description, while indicating various embodiments and numerous specific details thereof, is given by way of illustration and not of limitation Many substitutions, modifications, additions or rearrangements may be made within the scope of the disclosure, and the disclosure includes all such substitutions, modifications, additions or rearrangements.

BRIEF DESCRIPTION OF THE DRAWINGS

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
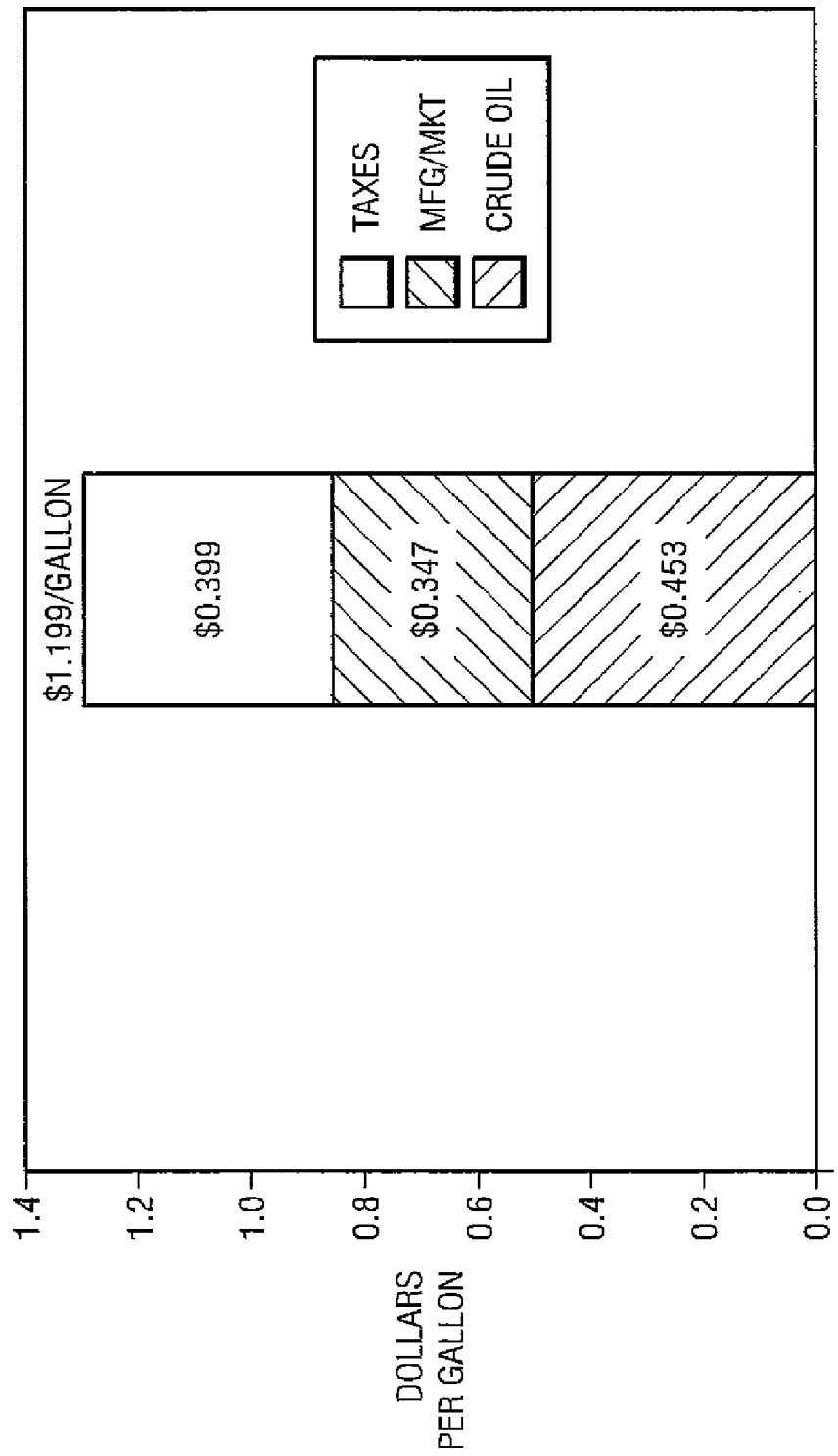
FIG. 1 depicts a plot diagram showing one way of dividing the retail price of gasoline into three components.
Figure 2:
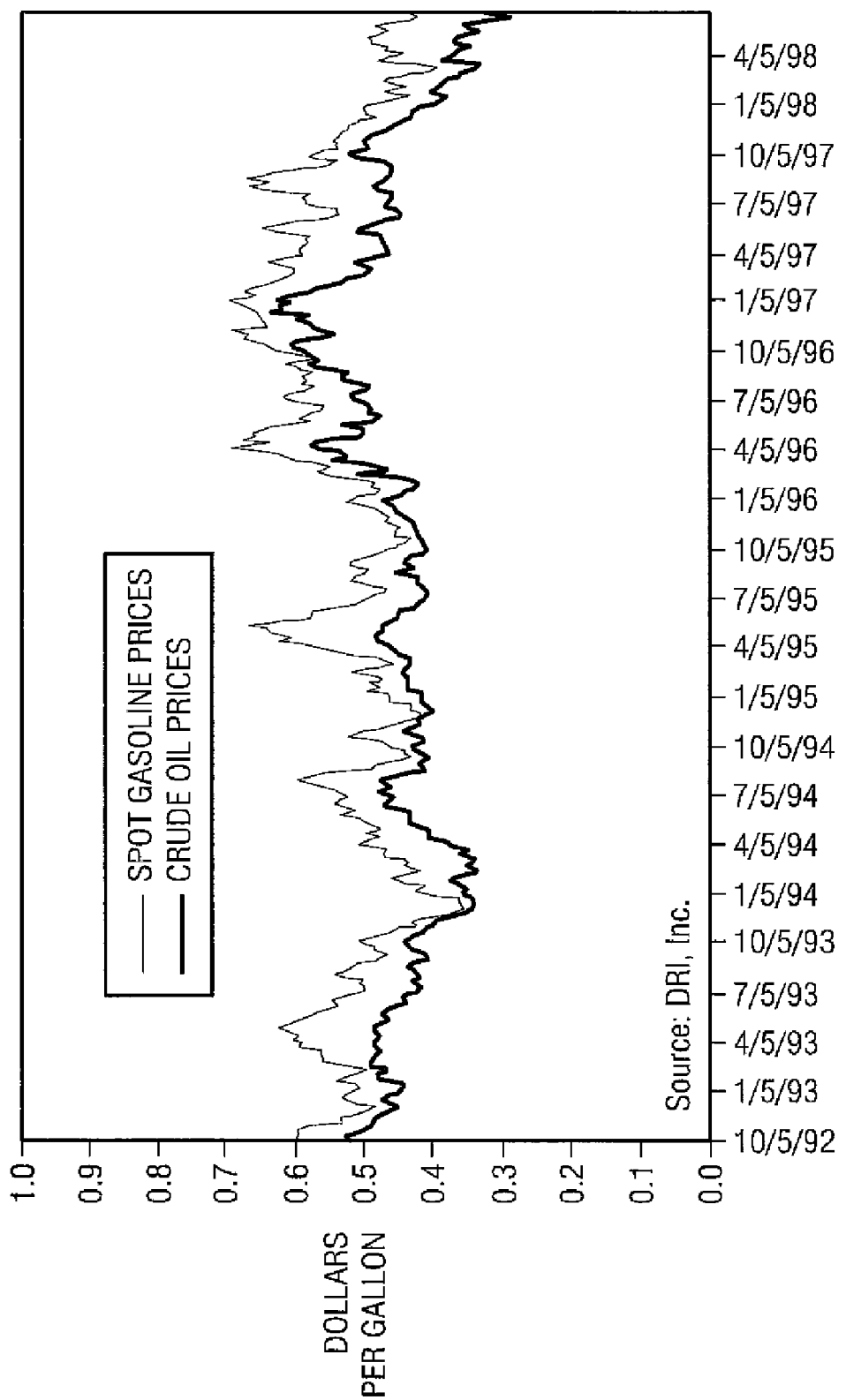
FIG. 2 depicts a plot diagram showing the historical relationship between crude oil prices and spot gasoline prices.
Figure 3:
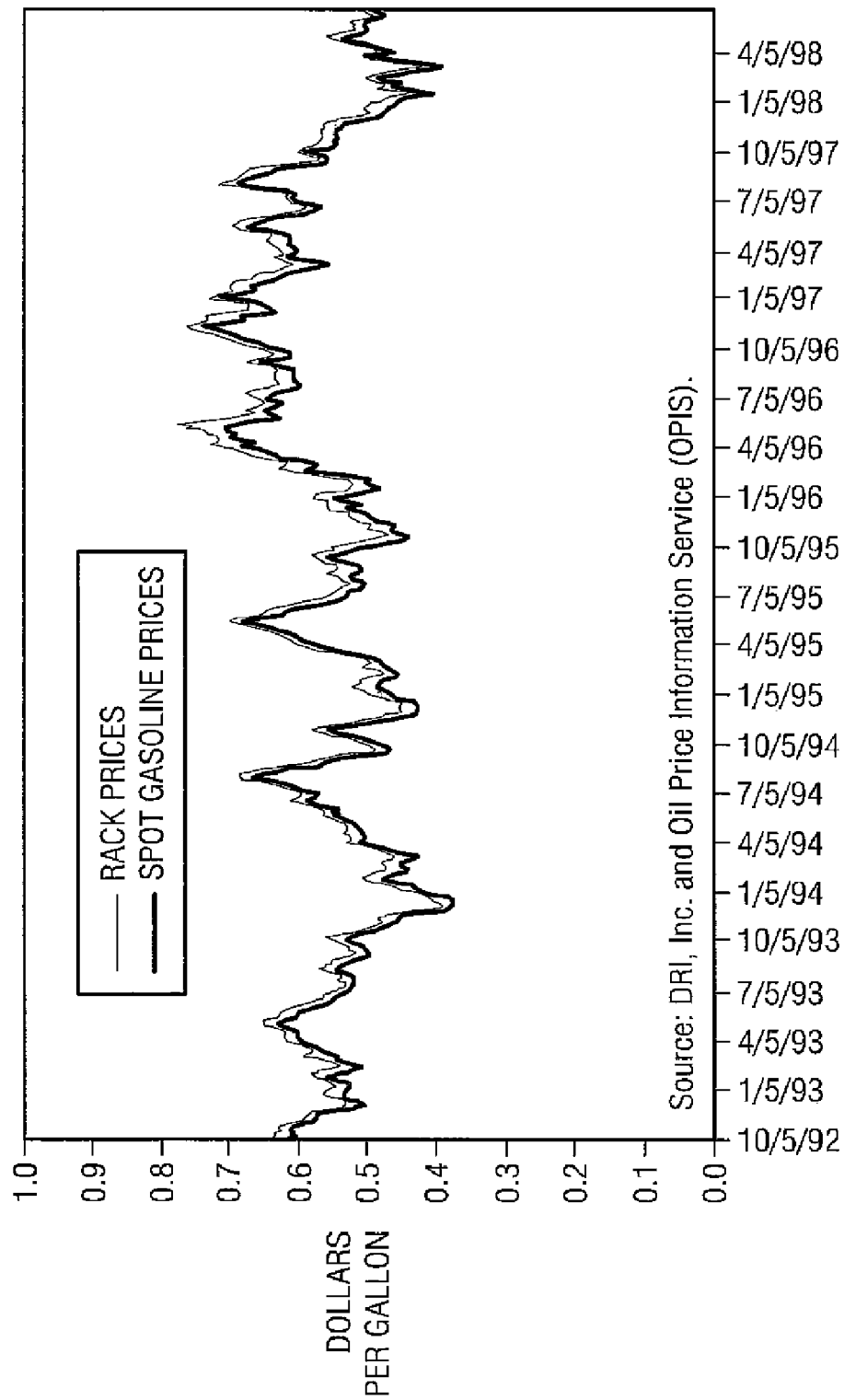
FIG. 3 depicts a plot diagram showing the historical relationship between spot gasoline prices and rack prices.
Figure 4:
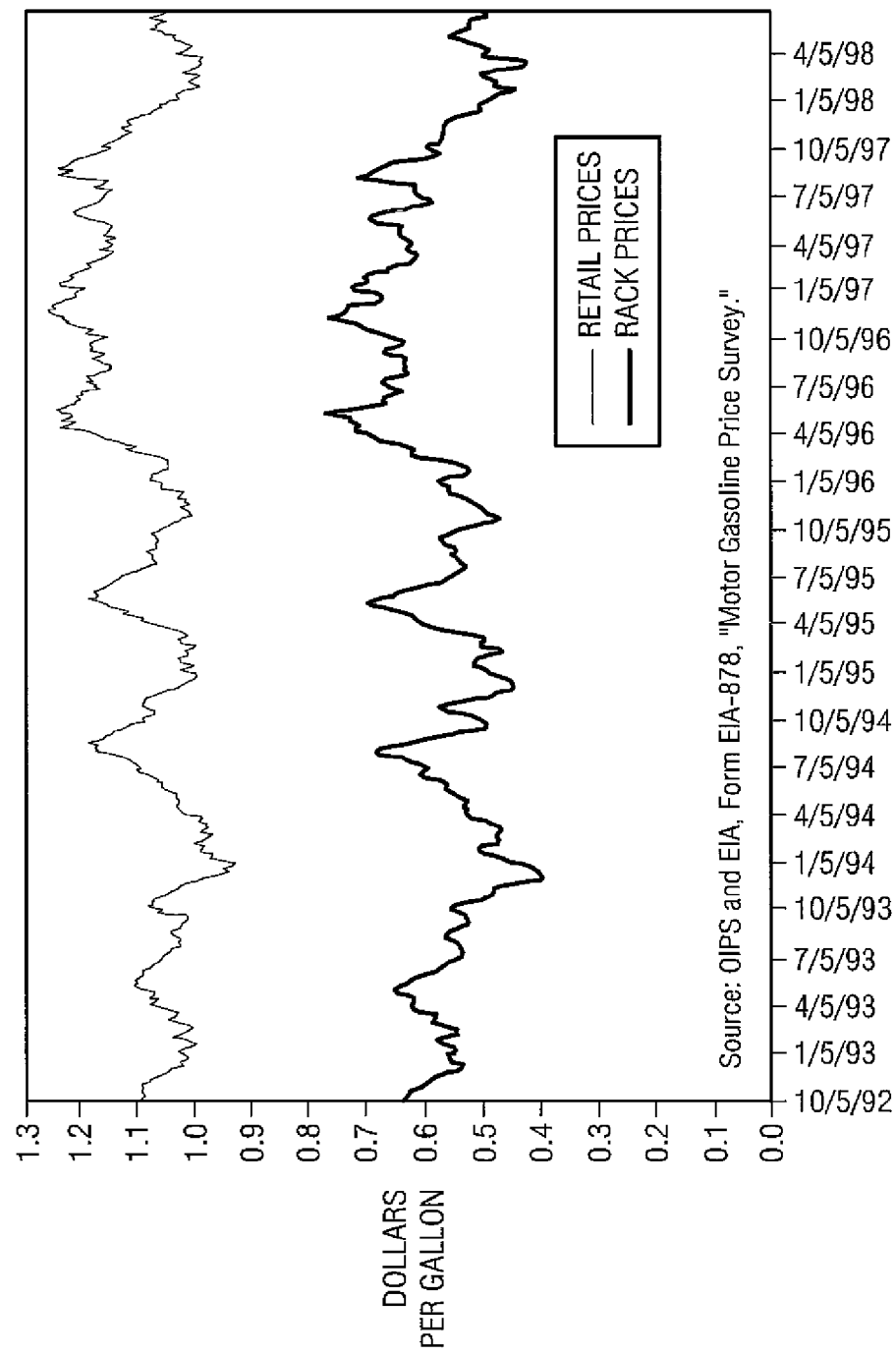
FIG. 4 depicts a plot diagram showing the historical relationship between rack prices and retail prices.
Figure 5:
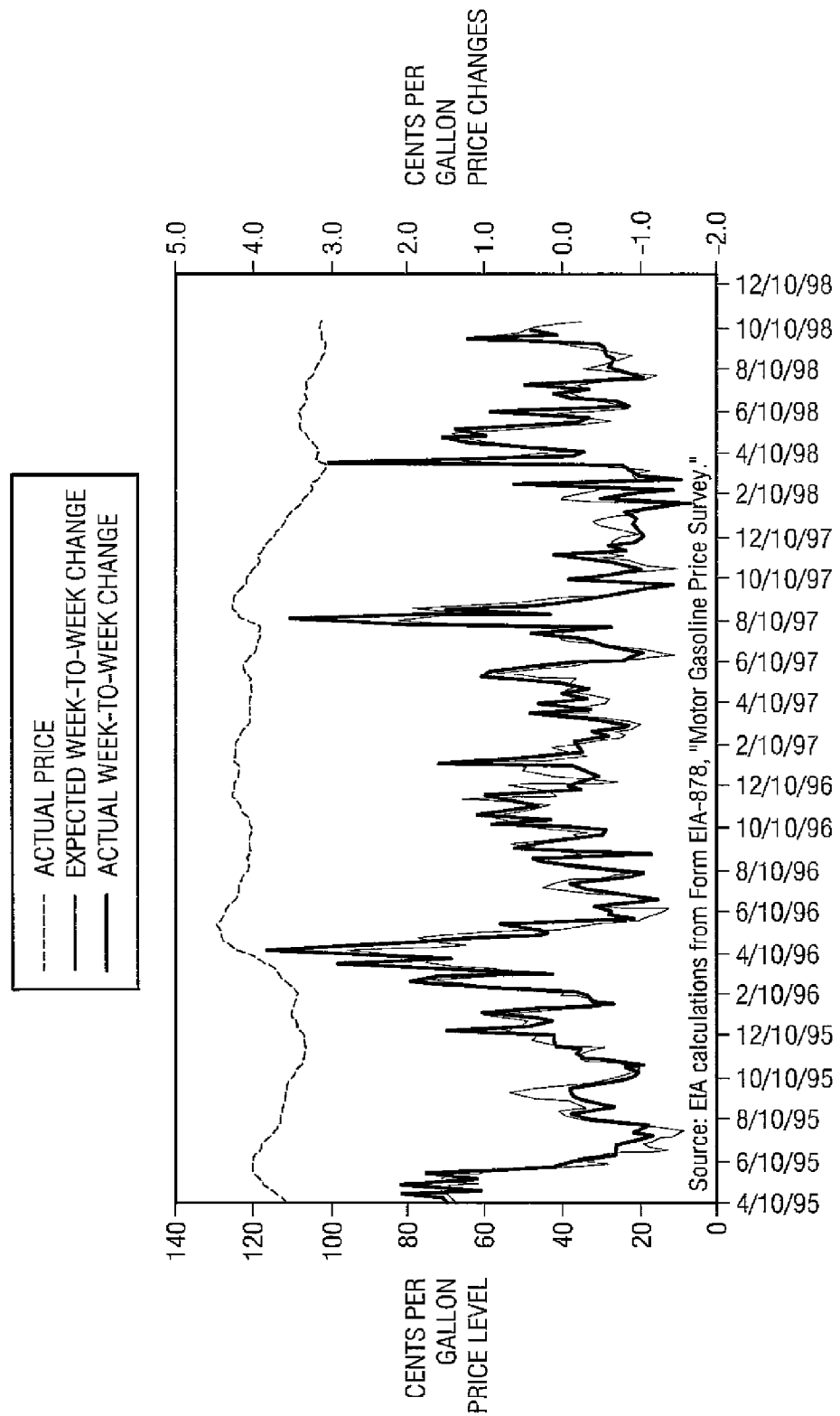
FIG. 5 depicts a plot diagram showing actual and forecasted retail prices for gasoline on a weekly basis at the national level.

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment," and the like.

Before discussing specific embodiments, an exemplary hardware architecture for implementing certain embodiments is described. Specifically, one embodiment can include a computer communicatively coupled to a network (e.g., the Internet). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (e.g., mouse, trackball, stylist, etc.), or the like. In some embodiments, the computer has access to at least one database.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media. Examples of computer readable media include, but are not limited to, non-volatile memories, volatile memories, DASD arrays, magnetic tapes, floppy diskettes, hard drives, optical storage devices, or any other appropriate computer-readable medium or storage device, etc. In one exemplary embodiment of the invention, the computer-executable instructions may include lines of complied C++, Java, HTML, or any other programming or scripting code.

Additionally, the functions of the present disclosure may be implemented on one computer or shared/distributed among two or more computers in or across a network. Communications between computers implementing embodiments of the invention can be accomplished using any electronic, optical, radio frequency signals, or other suitable methods and tools of communication in compliance with known network protocols.

Attention is now directed to one exemplary process flow for determining estimated future retail prices for a retail commodity over a time period in a market defined by a geographic boundary. Within this disclosure, a geographic boundary may be defined as a city, a borough, a county, a state, a country, a region, a zip code, or other predetermined area, or may be arbitrarily defined as a designated market area (DMA), or some combination or division.

The retail price of a commodity can have many components. Take gasoline as an example, in one embodiment, the retail price for gasoline may be divided into four components: the wholesale price component, the rack markup component, the retail markup component, and the taxes component. Although gasoline is used herein as a specific example of a retail commodity, one skilled in the art will appreciate that embodiments disclosed herein may be implemented or otherwise adapted for virtually any commodities, including, but not limited to electricity, natural gas, ethanol, etc.

Figure 6:
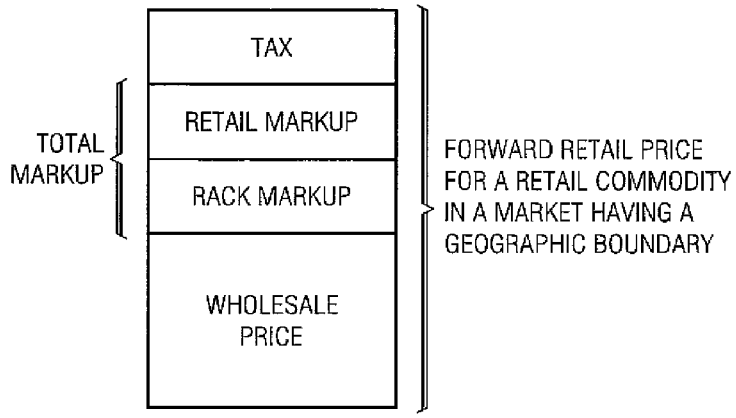
FIG. 6 depicts a simplified block diagram showing components of the forward retail price for a retail commodity according to one embodiment.

In the example shown in FIG. 6, the rack markup and the retail markup components together represent the total markup price for gasoline. Although lagged wholesale gasoline prices may be used to forecast retail gasoline prices on a week-by-week basis at the national level, there is not a direct and precisely predictable correlation between wholesale prices and retail prices that can be used to predict forward retail gasoline prices below the national level and/or within a particular locale, including, but not limited to, city, a borough, a county, a state, a country, a region, a zip code, a designated market area (DMA) or the like, and may include some combination or division thereof.

Embodiments disclosed herein provide the ability to predict, in a more reliable and accurate manner, forward retail prices of a retail commodity over a period of time in a market having a geographic boundary. This ability can be advantageous to an entity that provides price protection on that retail commodity to other entities as well as end consumers in that market. In some embodiments, the pricing model disclosed herein can be compared with historical fuel consumption and potential hedging schemes to implement a comprehensive solution (also referred to as the Pricelock system) for price protection on retail commodities. For more detailed teachings on the Pricelock system, readers are directed to U.S. patent application Ser. No. 11/705,571, filed Feb. 12, 2007, entitled "METHOD AND SYSTEM FOR PROVIDING PRICE PROTECTION FOR COMMODITY PURCHASING THROUGH PRICE PROTECTION CONTRACTS," which is incorporated herein as if set forth in full. As one skilled in the art can appreciate, the estimated future retail fuel prices can be useful in estimating future fuel costs and volatility as well as potential benefits from a price cap created via the aforementioned Pricelock system. Within this disclosure, the terms "gasoline", "gas", and "fuel" are used interchangeably.

As a specific example, suppose it is desired to provide price protection services against retail gasoline prices to customers located in Austin, Tex., U.S.A. In order to price such services competitively and profitably, a price protection service provider would need to know what the projected future retail price for gas in Austin would be three months from now, six months from now, a year from now, and so on. In some embodiments, such knowledge may be obtained by synthetically creating a forward market curve of an expected retail price for gasoline for a year or some longer period. To create such a forward market curve for projecting the future retail prices for gasoline in Austin, one would need to first assess the aforementioned components (i.e., the wholesale price component, the rack markup component, the retail markup components, and the tax component) of today's retail price for gasoline with respect to Austin.

In some embodiments, the wholesale price component of the retail price for gasoline includes and closely correlates to the price of crude oil. In some embodiments, the wholesale price component of the retail price for gasoline on any particular day can be determined based on some futures contract traded on the New York Mercantile Exchange (NYMEX) on that day. Examples of suitable futures contracts may include, but not limited to, unleaded gasoline futures contracts, reformulated gasoline blendstock for oxygenate blending (RBOB) futures contracts, or the like.

RBOB is an unfinished gasoline product that does not contain the oxygenate methyl tertiary butyl ether chemical (MTBE), which is banned in many states for polluting groundwater. RBOB contracts are traded per grade on the NYMEX on the wholesale basis in units of 1,000 barrels (42,000 gallons). They are based on delivery at petroleum products terminals in the New York harbor, the major East Coast trading center for imports and domestic shipments from refineries in the New York harbor area or from the Gulf Coast refining centers. RBOB conforms to industry standards for reformulated regular gasoline blendstock for blending with 10% denatured fuel ethanol (92% purity) as listed by the Colonial Pipeline for fungible F grade for sales in New York and New Jersey. As a specific example, traded in the New York Harbor barge market, RBOB is a wholesale non-oxygenated blendstock that is ready for the addition of 10% ethanol at the truck rack.

In addition to RBOB, other refined products may include gasoline meeting the specifications of the California Air Resources Board (CARB), CARB diesel fuel, low-sulfur and ultra-low-sulfur diesel fuel, and oxygenates (liquid hydrocarbon compounds containing oxygen), conventional gasoline, distillates, jet fuel, asphalt, petrochemicals, lubricants. Gasoline is the largest single volume refined product sold in the United States and accounts for almost half of national oil consumption. It is a highly diverse market, with hundreds of wholesale distributors and thousands of retail outlets, making it subject to intense competition and price volatility. These refined products, branded and unbranded, are generally marketed on a wholesale basis in the United States and Canada through a bulk and rack marketing network. Some producers may sell refined products through their own network of retail and wholesale branded outlets.

While the wholesale price component represents the price of gasoline at the refinery level, the rack markup component represents the cost to deliver that gas from a refinery to a retailer such as a gas station (i.e., from wholesale to rack). The retailer buys the gas at the rack price, sometimes referred to as the rack rate, which is typically marked up by whoever is involved in the transportation and distribution chain, including terminal distribution facilities, transportation companies, etc. Sellers at each step of the distribution chain generally try to set their target prices at a level reflecting their current costs plus a markup.

Studies have found that the rack price and the wholesale price are closely correlated. Thus, in some embodiments, the rack markup component may be determined using the wholesale price component, perhaps taking a percentage thereof as an input to the rack markup component. In some embodiments, the rack markup component may be determined using information provided by an information service provider such as Oil Price Information Service (OPIS) of Rockville, Md., USA. OPIS tracks what rack markups would be, perhaps based on historical data. Gasoline and diesel rack prices are available from OPIS for more than 360 wholesale rack locations every day. In addition, over 240 cities nationwide contain the OPIS Smart Rack which details retail gasoline lows, averages and margins.

The tax component may include all types of taxes related to a retail commodity. In the case of petroleum products, in addition to income, severance, production, property, and other taxes, they are subject to various excise taxes. Specifically, in some embodiment, the tax component may include federal gas tax, state and local gas taxes, and fees. The federal tax is collected in all states in addition to any state or local taxes on gasoline sales. As an example, the federal gas tax may be 18.4 cents per gallon (cpg) while the state gas tax may be 20 cpg in the state of Texas.

Gasoline taxes are levied in various ways in different states. Each state may impose different amounts of taxes depending upon the type and/or grade and may include different types of charges and fees. For example, according to data collected by the American Petroleum Institute (API) in 2005, in the state of Alabama, the state gas tax is 18 cpg for gasoline and 19 cpg for diesel, each type of tax including a 2-cpg inspection fee. Some states, such as Alaska, Arizona, California, Georgia, Hawaii, Idaho, Louisiana, Massachusetts, Minnesota, Mississippi, Missouri, Nebraska, New Hampshire, North Carolina, North Dakota, Ohio, Oregon, Rhode Island, South Carolina, South Dakota, Texas, Utah, Washington, West Virginia, Wisconsin, and Wyoming, levy a flat rate per gallon for gasoline and diesel.

Some states allow local communities to levy gasoline taxes in addition to any state taxes that might be levied. Some may charge a tax similar to a sales tax in that it applies to the monetary amount of the gasoline sold. For example, in the state of California, the state gas tax is 18 cpg for gasoline and diesel, plus a 6% state sales tax, a 1.25% county tax, and additional local sales taxes. Thus, determining the amount of tax paid on one gallon of gasoline or diesel fuel purchased by a consumer at the pump can involve numerous factors and calculations. The tax rate may vary depending on the whether the area where the fuel is purchased is in compliance with federal clean air standards, whether a threshold amount of revenue has been collected for the taxing jurisdiction for the fiscal year, and how much is being charged for the pre-tax price of a gallon of fuel.

The API is one exemplary source that collects motor fuel tax information for all 50 states and compiles a report and chart detailing changes from the previous update and calculating a nationwide average. Although tax rates do change, they are considered relatively stable as compared to crude oil prices, which could fluctuate continuously, not just daily. Thus, in some embodiments, tax information obtained from the API can be parsed for use in the tax component in determining the forward retail price for gasoline in a market having a geographic boundary.

Thus, as a simplified example, the wholesale price component can be parsed from RBOB contracts, the rack markup component can be derived from data provided by the OPIS, and the tax component can be calculated based on information provided by the API. The retail markup component, however, is very difficult to determine as each retailer may tailor the markup, which is often kept secret, per location (L), time period (T), and grade (G). In some embodiments, as discussed below, the retail markup component can be estimated, alone with the rack markup component, based on purchased wholesale gas pricing data. Current retail prices from other sources may also be utilized to determine the retail markup component with respect to a particular location (L), time period (T), and grade (G).

Figure 7:
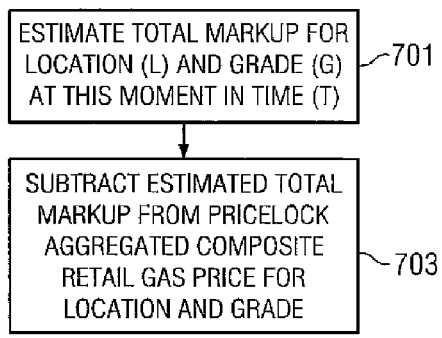
FIG. 7 is a flow diagram depicting one example embodiment of a method for determining the current retail price of a commodity for a specific location (L), time period (T), and grade (G).

FIG. 7 is a flow diagram depicting one example embodiment of a method for determining the current retail price of a commodity for a specific location (L), time period (T), and grade (G) As described above, software code implementing embodiments of the present invention can be stored on a computer-readable medium and executed by a processor to cause the processor to perform particular functions disclosed herein.

At step 701, according to one embodiment, a first functionality operates to estimate the total markup, which includes the rack markup and the retail markup, for gas for a specified location and grade. The determination of the Estimated Total Markup (ETM) can be based on a number of factors. For example, the ETM may be determined based on purchased wholesale gas pricing data, where available, from oil companies, regional retailers, OPIS, and/or other similar sources. Additionally, the ETM may be determined by extrapolating or 'reverse engineering' historical differences in wholesale pricing from NY delivery markets and other markets across the nation, but using the retail prices to begin the extrapolation. In this example, the retail markup is therefore the difference between the ETM and the rack markup.

Figure 8:
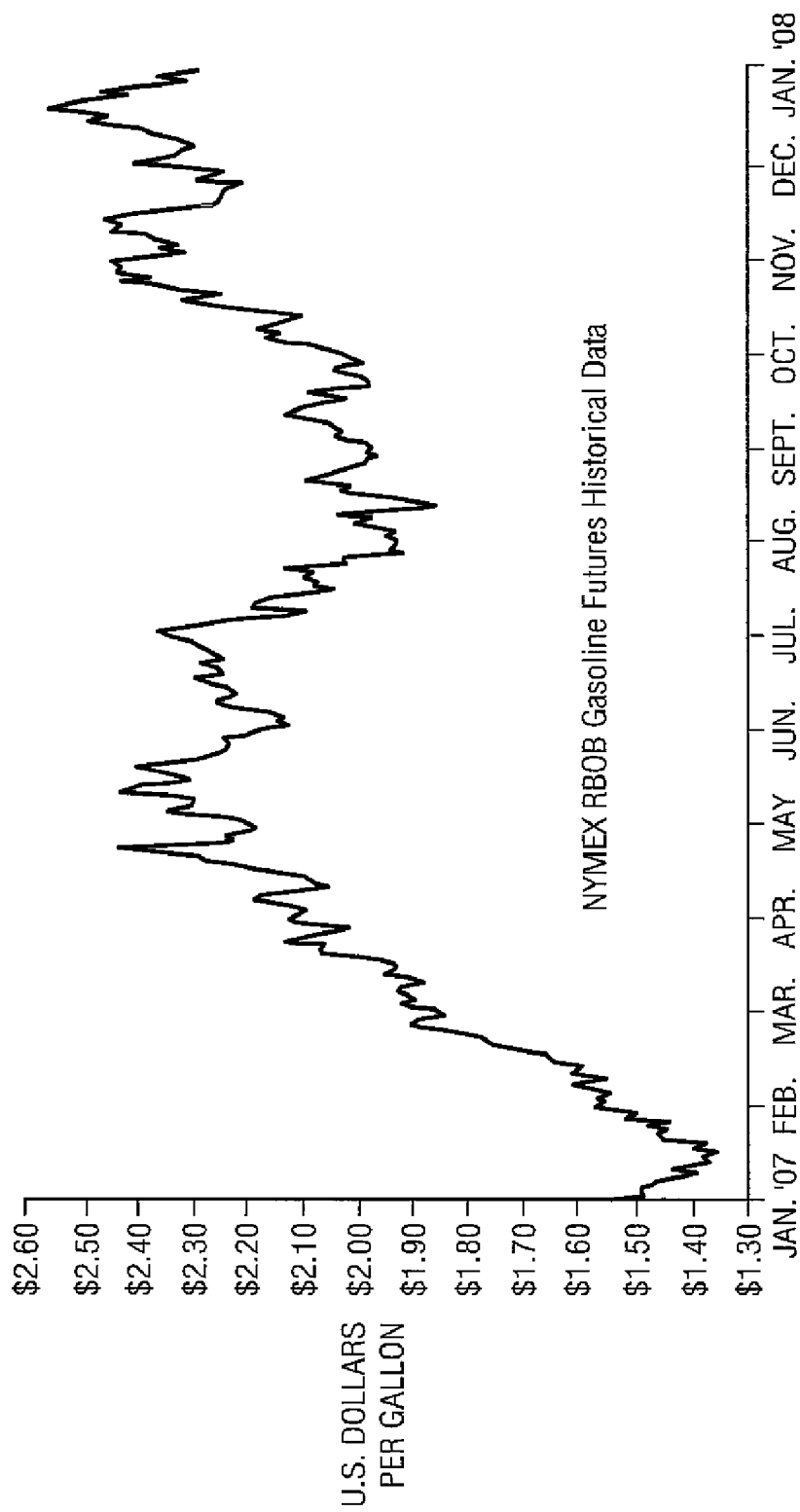
FIG. 8 is a plot diagram depicting exemplary NYMEX RBOB gasoline futures historical data.

As a specific example, a RBOB contract may be utilized as algorithm input on the wholesale gasoline price. FIG. 8 is a plot diagram depicting exemplary NYMEX RBOB gasoline futures historical data. If the NY delivery markets (from which the RBOB contract is priced) historically have differed by 10% for California markets, then the California projected wholesale pricing could be adjusted by this difference.

According to embodiments disclosed herein, another factor in determining the ETM is an aggregated composite retail price for gasoline for a location and grade, which is referred to herein as "Pricelock Aggregated Composite Retail Price (PACRP)" and which is generated by a proprietary system and method for determining a retail commodity price within a geographic boundary. For detailed teachings on the PACRP, readers are directed to co-pending U.S. patent application Ser. No. 12/030,119, filed February 12, 2008, entitled "SYSTEM AND METHOD OF DETERMINING A RETAIL COMMODITY PRICE WITHIN A GEOGRAPHIC BOUNDARY," which is hereby incorporated herein as if set forth in full. Other types of aggregated composite retail price for gasoline within a specific locale may also be utilized. In some embodiments, the ETM is the difference between the PACRP and the wholesale price by fuel type/grade and location.

At step 703, a second functionality operates to subtract the ETM from the PACRP for a specific location and a specific grade or type of fuel to generate the effective wholesale price for that particular location and that particular grade. The output of this step is to have estimated wholesale gas prices, by location and grade, at the current moment.

Figure 9:
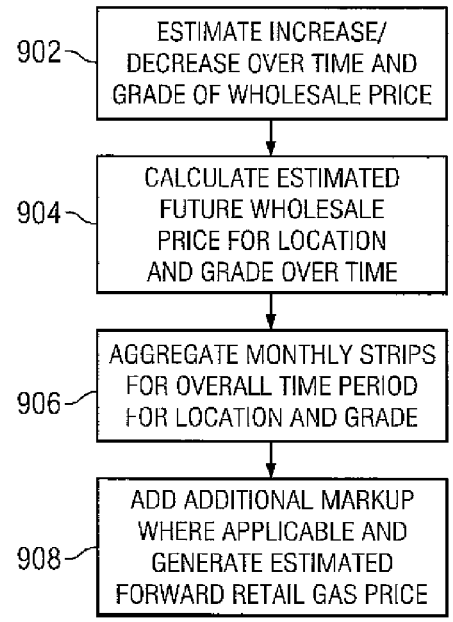
FIG. 9 is a flow diagram depicting a method for synthetically creating a forward market curve of an expected retail price for gasoline for a period of time within a market having a geographic boundary.

FIG. 9 is a flow diagram depicting a method for synthetically creating a forward market curve of an expected retail price for gasoline for a period of time within a market having a geographic boundary. Referring to the above specific example where it is desired to provide price protection services with respect to retail gasoline prices to customers located in Austin, Tex., U.S.A., such a forward market curve can be utilized to project the future retail prices for gasoline in Austin three months from now, six months from now, a year from now, and so on.

Figure 10:
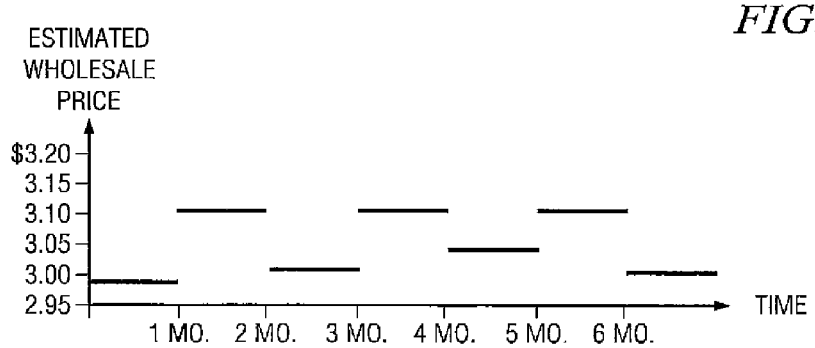
FIG. 10 is an exemplary plot depicting the increase as well as decrease of the estimated wholesale price over time.

According to one embodiment, the Estimated Forward Retail Gas Price (EFRP) can be projected, station by station, using the following components: RBOB contracts on wholesale gas by type and time period, the current ETM for each location and fuel type, the market volatility and current gas trend as the wholesale to retail correlation and price change lag can differ under various market conditions. Examples of market conditions include contango and backwardation. Backwardation describes a market where spot or prompt prices are higher than prices in the future—a downward sloping forward curve. It indicates that prompt demand is high. Contango is the opposite, with future prices higher than spot prices. By way of example, at step 902, software code implementing a third functionality may be executed to estimate, for each grade (fuel type), the increase/decrease of the wholesale price over a period of time using project wholesale pricing from futures market on NY delivery markets. FIG. 10 is an exemplary plot depicting the increase as well as decrease of the estimated wholesale price over time.

Next, at step 904, software code implementing a fourth functionality may be executed to consider the market conditions inherent in the forward contracts (e.g., contango or backwardation) and determine the rate of change between the retail and wholesale spreads over time. This step can provide a desired granularity on the final outcome. For example, an individual station EFRP may be calculated by applying the adjusted ETM (based on step 902) to each monthly forecasted MERC wholesale contract price. This near final station EFRP can be further adjusted by a "market trend" factor, depending on whether it is in a contango or a backwardated market.

At step 906, according to one embodiment, software code implementing a fifth functionality may operate to determine a geographic EFRP by aggregating, station by station, EFRP monthly 'strips'. The geographic EFRP (e.g., local, regional, national, etc.) may be calibrated by weighting individual EFRPs based on gas purchase volumes by fuel type.

At step 908, according to one embodiment, software code implementing a sixth functionality may operate to determine additional markup where applicable. For example, a sensitivity analysis may be performed on the EFRP from step 906 based on world events. Furthermore, the functionality may be configured with an ability to "toggle" pricing based upon a choice of user-defined events such as hurricanes, war, political changes. Although these events are theoretically priced into the forward contracts on wholesale prices, they are assumed to be low probability. However, once they occur, the price of gas can spike upward and modify pricing on forward contracts. The algorithm used to calculate effects on the EFRP can be implemented to rely on historical analysis of actual retail price changes across the nation due to actual events and their individual event locations. For example, Hurricane Katrina, which struck the United States through the Gulf of Mexico, may impact gas wholesale prices differently than Hurricane Andrew, which struck the Atlantic Coast. Thus, software code implementing this algorithm can be a useful tool for adding sensitivities to the underlying process of creating the forward total retail gas price based on prior events. Any additional markup is then added to the geographic EFRP, perhaps weighted, to generate the estimated forward retail gas price for the specified fuel type/grade and time. In some embodiments, the specified time period may range from one month to six months.

In the foregoing specification, the invention has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the disclosure as defined in the following claims and their legal equivalents.

We claim:

1. A method for determining a forward retail price of a commodity, comprising:
   determining, by a computer system comprising a processor and a non-transitory computer-readable medium, a current retail price of the commodity for a specific location within a geographic boundary, wherein the current retail price of the commodity comprises a wholesale price component, a total markup component, and a tax component, and wherein the total markup component comprises a rack markup component and a retail markup component;
   subtracting, by the computer system, an estimated total markup of the commodity for the specific location from an aggregated composite retail price of the commodity for the specific location to generate an estimated current wholesale price of the commodity for the specific location; and
   creating, by the computer system, a forward market curve indicating forward retail price of the commodity for a corresponding period of time within the geographic boundary, wherein creating the forward market curve comprises:
   determining, by the computer system, a rate of change between retail pricing and wholesale pricing for the commodity over a past period of time for each location within the geographic boundary on a monthly basis;
   forecasting, by the computer system, future wholesale prices and estimated total markup for each location within the geographic boundary on a monthly basis;
   calculating, by the computer system, an estimated forward retail price for each location within the geographic boundary on a monthly basis based on a plurality of factors, wherein the plurality of factors includes the current retail price of the commodity, the estimated current wholesale price of the commodity, and the rate of change; and
   aggregating, by the computer system, the estimated forward retail price, location by location, within the geographic boundary on a monthly basis.

2. The method of claim 1, wherein the plurality of factors includes market conditions, wherein the market conditions include contango and backwardation, wherein contango describes a market where spot prices of the commodity are lower than future prices of the commodity, and wherein backwardation describes a market where spot prices of the commodity are higher than future prices of the commodity.

3. The method of claim 1, wherein the commodity is a specific grade of motor fuel.

4. The method of claim 1, wherein the total markup component is determined by extrapolating, by the computer system, historical differences between retail pricing and wholesale pricing for the commodity based on historical data from a plurality of markets over a past period of time.

5. The method of claim 1, wherein the total markup component is determined by estimating, by the computer system, a difference between the wholesale price component and an aggregated composite retail price for the commodity.

6. The method of claim 1, wherein the commodity is gasoline, further comprising weighting, by the computer system, the estimated forward retail price based on gas purchase volumes by fuel type per each location within the geographic boundary.

7. The method of claim 1, further comprising determining, by the computer system, an additional markup applicable to the estimated forward retail price for each location within the geographic boundary.

8. The method of claim 7, wherein at least one additional markup is determined based on a user-defined event with respect to an event location.

9. The method of claim 7, further comprising applying, by the computer system, a weighting factor to the additional markup.

10. A non-transitory computer-readable medium storing program instructions executable by a processor to perform the steps comprising:
    determining a current retail price of a commodity for a specific location within a geographic boundary, wherein the current retail price of the commodity comprises a wholesale price component, a total markup component, and a tax component, and wherein the total markup component comprises a rack markup component and a retail markup component;
    subtracting an estimated total markup of the commodity for the specific location from an aggregated composite retail price of the commodity for the specific location to generate an estimated current wholesale price of the commodity for the specific location; and
    creating a forward market curve indicating forward retail price of the commodity for a corresponding period of time within the geographic boundary, wherein creating the forward market curve comprises:
    determining a rate of change between retail pricing and wholesale pricing for the commodity over a past period of time for each location within the geographic boundary on a monthly basis;
    forecasting future wholesale prices and estimated total markup for each location within the geographic boundary on a monthly basis;
    calculating an estimated forward retail price for each location within the geographic boundary on a monthly basis based on a plurality of factors, wherein the plurality of factors includes the current retail price of the commodity, the estimated current wholesale price of the commodity, and the rate of change; and
    aggregating the estimated forward retail price, location by location, within the geographic boundary on a monthly basis.

11. The non-transitory computer-readable medium of claim 10, wherein the retail commodity is gasoline and wherein the program instructions are further executable by the processor to perform estimating the wholesale price changes per fuel type or grade.

12. The non-transitory computer-readable medium of claim 10, wherein the program instructions are further executable by the processor to perform adjusting the estimated forward retail price based on one or more market conditions.

13. The non-transitory computer-readable medium of claim 10, wherein the program instructions are further executable by the processor to perform weighting the estimated forward retail price based on gas purchase volumes by fuel type per each location within the geographic boundary.

14. The non-transitory computer-readable medium of claim 10, wherein the program instructions are further executable by the processor to perform adding at least one additional markup to the estimated forward retail price for each location within the geographic boundary based on a user-defined event with respect to an event location.

15. The non-transitory computer-readable medium of claim 14, wherein the program instructions are further executable by the processor to perform applying a weighting factor to the at least one additional markup.

16. The non-transitory computer-readable medium of claim 10, wherein the program instructions are further executable by the processor to generate a forward market curve of an expected retail price for the retail commodity within the geographic boundary for at least one year based on the estimated forward retail price aggregated location by location within the geographic boundary on a monthly basis.

17. A system comprising:
a processor; and
a non-transitory computer-readable medium, communicatively coupled to the processor, storing program instructions executable by the processor to perform the steps comprising:
determining a current retail price of a commodity for a specific location within a geographic boundary, wherein the current retail price of the commodity comprises a wholesale price component, a total markup component, and a tax component, and wherein the total markup component comprises a rack markup component and a retail markup component;
subtracting an estimated total markup of the commodity for the specific location from an aggregated composite retail price of the commodity for the specific location to generate an estimated current wholesale price of the commodity for the specific location; and
creating a forward market curve indicating forward retail price of the commodity for a corresponding period of time within the geographic boundary, wherein creating the forward market curve comprises:
determining a rate of change between retail pricing and wholesale pricing for the commodity over a past period of time for each location within the geographic boundary on a monthly basis;
forecasting future wholesale prices and estimated total markup for each location within the geographic boundary on a monthly basis;
calculating an estimated forward retail price for each location within the geographic boundary on a monthly basis based on a plurality of factors, wherein the plurality of factors includes the current retail price of the commodity, the estimated current wholesale price of the commodity, and the rate of change; and
aggregating the estimated forward retail price, location by location, within the geographic boundary on a monthly basis.

18. The system of claim 17, wherein the retail commodity is gasoline and wherein the program instructions are further executable by the processor to perform estimating the wholesale price changes per fuel type or grade.

19. The system of claim 17, wherein the program instructions are further executable by the processor to perform adjusting the estimated forward retail price based on one or more market conditions.

20. The system of claim 17, wherein the program instructions are further executable by the processor to perform weighting the estimated forward retail price based on gas purchase volumes by fuel type per each location within the geographic boundary.

* * * * *